(12) United States Patent
Weisenstein et al.

(10) Patent No.: US 11,228,065 B1
(45) Date of Patent: Jan. 18, 2022

(54) RECOMBINATION SYSTEMS FOR AQUEOUS BATTERIES

(71) Applicant: ZAF ENERGY SYSTEMS, INCORPORATED, Bozeman, MT (US)

(72) Inventors: Adam Weisenstein, Bozeman, MT (US); William A. Garcia, Bozeman, MT (US); Melissa D. McIntyre, Butte, MT (US); Eivind Listerud, Osceola, MO (US)

(73) Assignee: ZAF ENERGY SYSTEMS, INCORPORATED, Bozeman, MT (US)

( * ) Notice: Subject to any disclaimer, the term of this patent is extended or adjusted under 35 U.S.C. 154(b) by 0 days.

(21) Appl. No.: 17/366,597

(22) Filed: Jul. 2, 2021

(51) Int. Cl.
*H01M 10/00* (2006.01)
*H01M 10/52* (2006.01)
*H01M 10/42* (2006.01)

(52) U.S. Cl.
CPC ..... *H01M 10/523* (2013.01); *H01M 10/4242* (2013.01)

(58) Field of Classification Search
CPC ............... H01M 10/526; H01M 10/24; H01M 10/4242; H01M 4/5815; H01M 2/0267
See application file for complete search history.

(56) References Cited

U.S. PATENT DOCUMENTS

| | | | |
|---|---|---|---|
| 8,563,150 B2 | 10/2013 | Bugnet et al. | |
| 9,947,919 B2 | 4/2018 | Phillips et al. | |
| 10,763,495 B2 | 9/2020 | Phillips et al. | |
| 2015/0207150 A1* | 7/2015 | Lang | H01M 4/8817 429/405 |
| 2020/0365953 A1* | 11/2020 | Pham | H01M 4/623 |

\* cited by examiner

*Primary Examiner* — Cynthia H Kelly
*Assistant Examiner* — Monique M Wills
(74) *Attorney, Agent, or Firm* — Brooks Kushman P.C.

(57) ABSTRACT

A secondary battery recombination system includes catalyst and hydrophobic gas diffusion layers defining an electrode that recombines hydrogen and oxygen into water, and a scaffold encapsulating and in non-bonded contact with the electrode. The electrode may be carbon cloth, carbon felt, carbon foam, or carbon paper. The scaffold may be expanded metal or perforated foil.

19 Claims, 4 Drawing Sheets

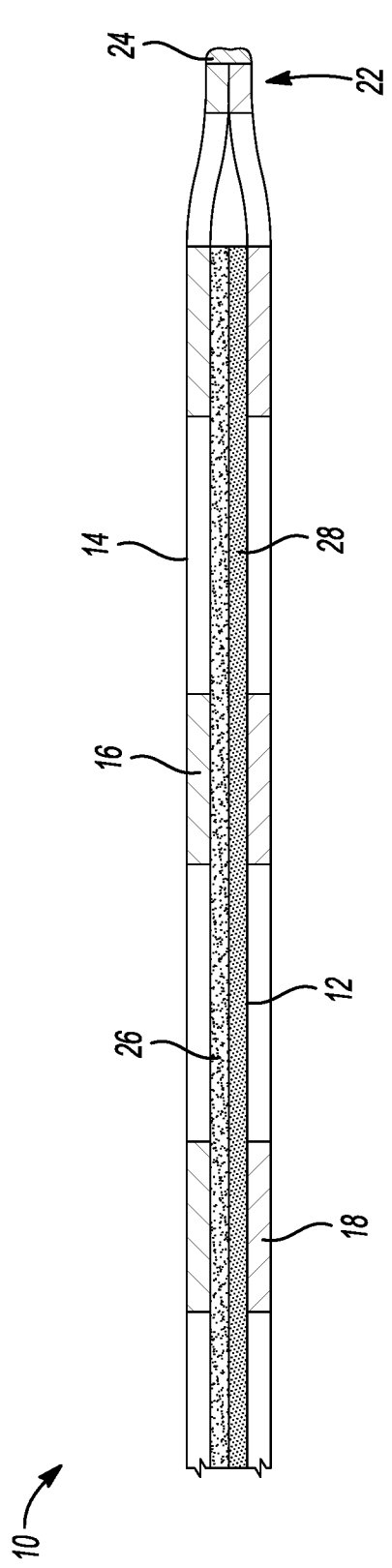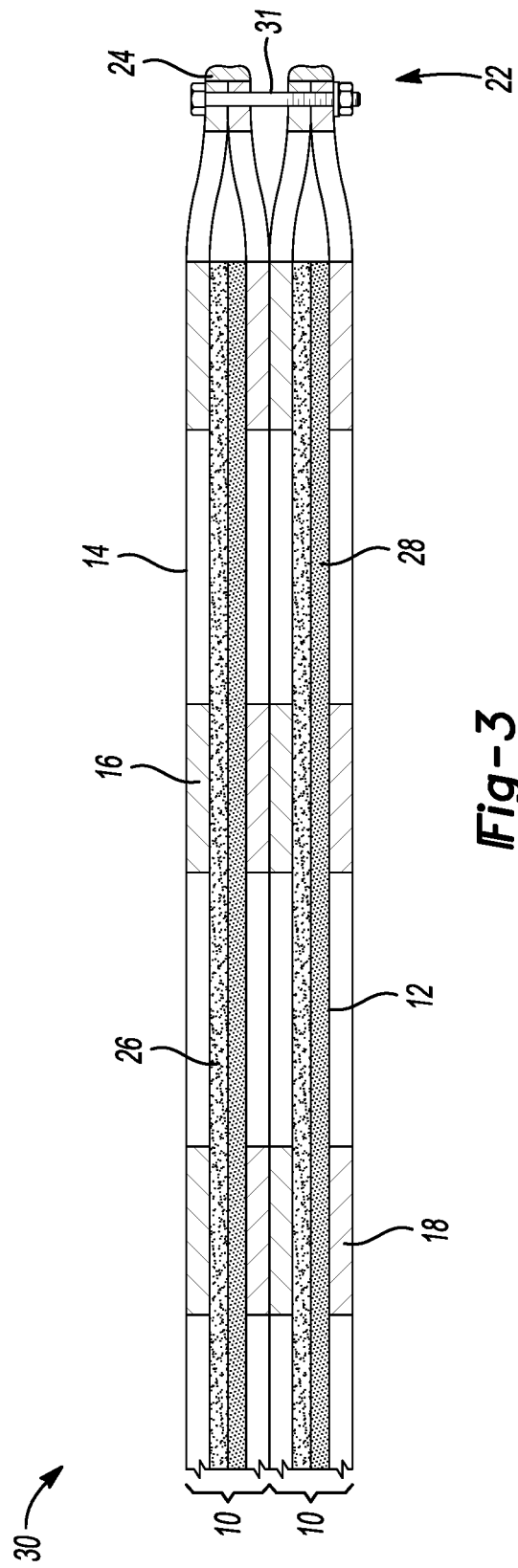

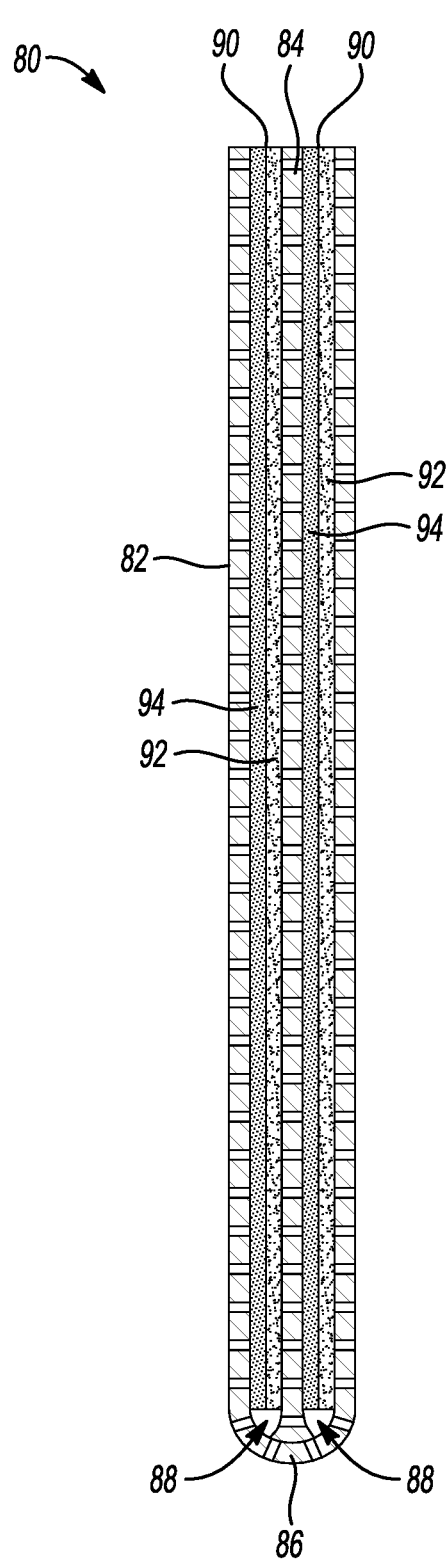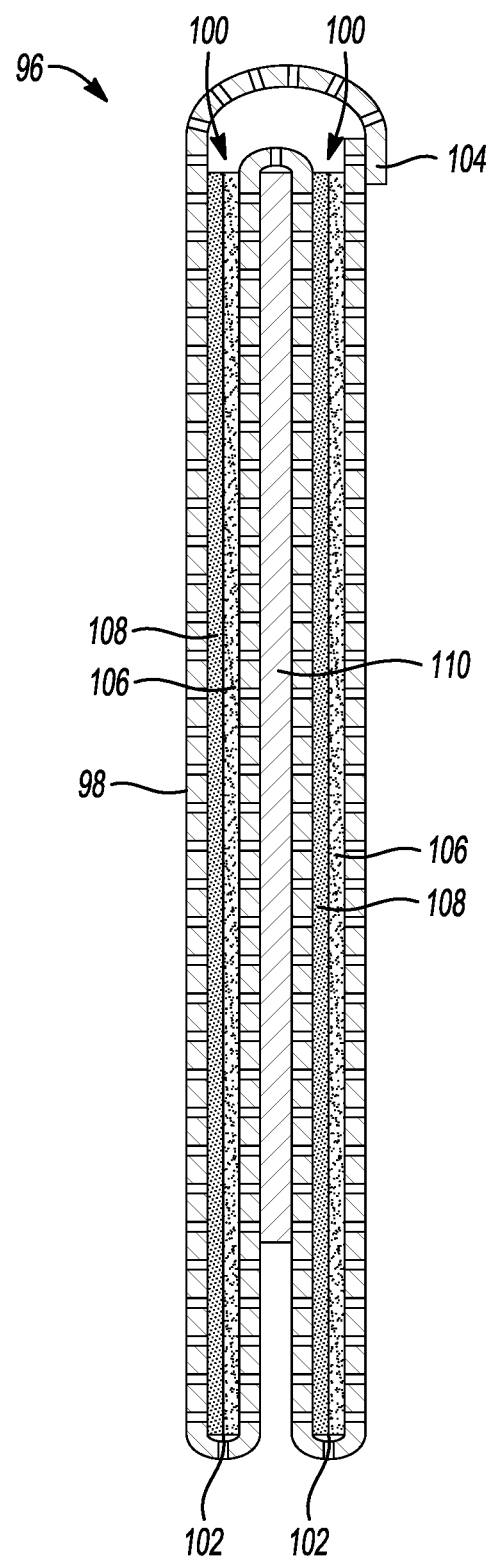
Fig-7
Fig-8

RECOMBINATION SYSTEMS FOR AQUEOUS BATTERIES

TECHNICAL FIELD

This disclosure relates to aqueous battery construction and operation.

BACKGROUND

Recombination devices may be used to limit the gas build-up and control internal pressure inside electrochemical cells that generate oxygen and hydrogen during various stages of operation. These recombination devices may facilitate the reaction of oxygen and hydrogen inside the cells to form water that will go back into the electrolyte solution, thus avoiding performance issues.

SUMMARY

A secondary battery recombination system includes catalyst and hydrophobic gas diffusion layers defining a carbon cloth electrode, a carbon felt electrode, a carbon foam electrode, or a carbon paper electrode. The catalyst layer recombines hydrogen and oxygen into water. The system also includes an expanded metal scaffold or perforated foil scaffold encapsulating and in non-bonded contact with the electrode.

A secondary battery recombination system includes a carbon cloth electrode, a carbon felt electrode, a carbon foam electrode, or a carbon paper electrode that recombines hydrogen and oxygen into water, and an expanded metal scaffold or perforated foil scaffold surrounding the electrode and arranged such that the scaffold and electrode define alternating discrete layers in contact with each other.

A secondary battery includes a battery terminal, and a recombination device mounted to the battery terminal. The recombination device includes a carbon cloth electrode, a carbon felt electrode, a carbon foam electrode, or a carbon paper electrode, and a metal scaffold in non-bonded contact with the electrode. The electrode includes catalyst and hydrophobic gas diffusion layers. The catalyst layer recombines hydrogen and oxygen into water.

BRIEF DESCRIPTION OF THE DRAWINGS

FIG. 2 is a side view, in cross-section, of the recombination system of FIG. 1.
FIGS. 3-7 are side views, in cross-section, of other recombination systems.
FIG. 8 is a side view, in cross-section, of a recombination system mounted to a battery tab.

DETAILED DESCRIPTION

Figure 1:
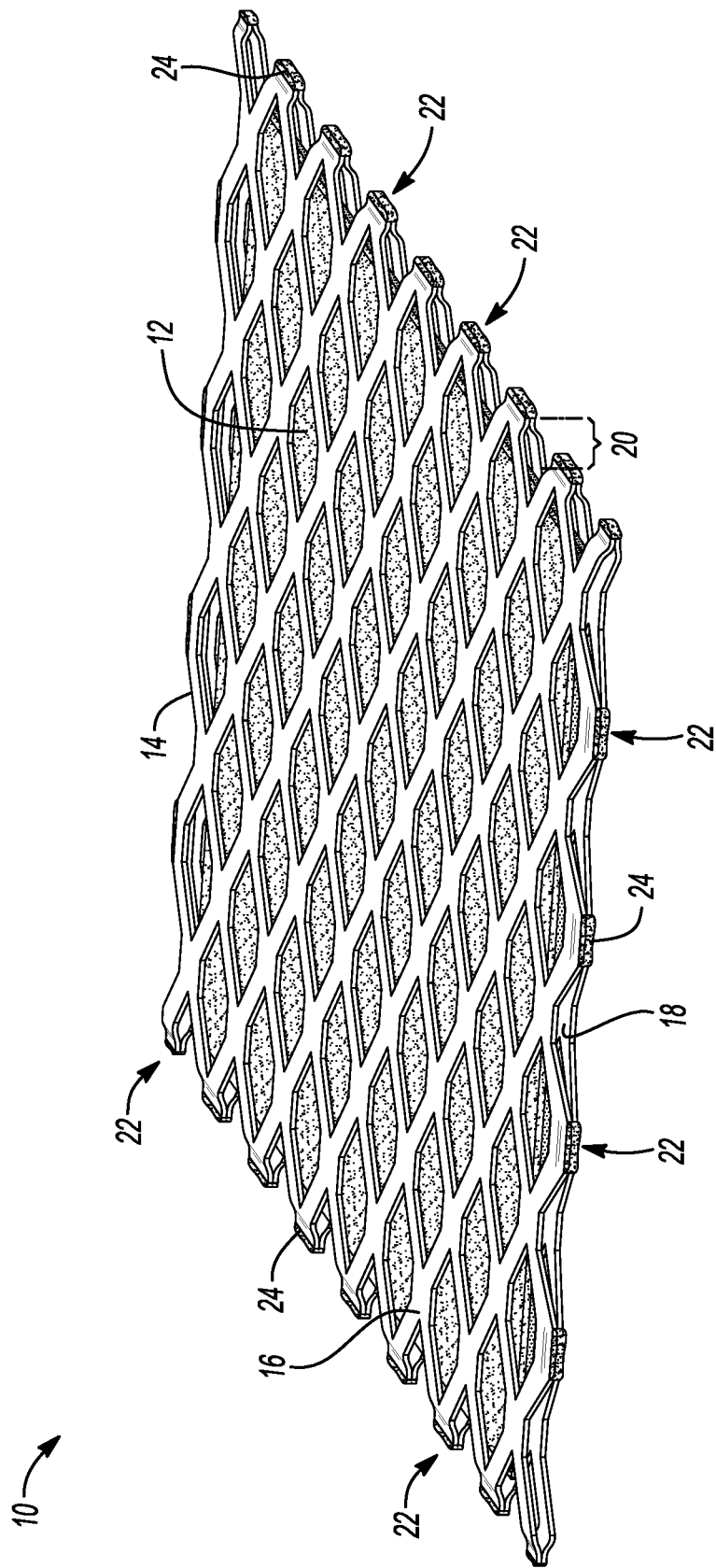
FIG. 1 is a perspective view of a recombination system.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Recombination systems for electrochemical devices (e.g., batteries) provide a means to recombine hydrogen and oxygen, during the battery charging cycle, to water. The implementation of highly functional recombination systems may extend the life of the batteries by mitigating the loss of water from aqueous based electrolytes. As such, improving the retention of water by recombining hydrogen and oxygen in secondary batteries with aqueous electrolytes may assist in achieving optimal electrochemical performance and cycle life.

Here, we consider recombination systems that, in certain examples, include a carbon cloth, carbon felt, carbon foam, or carbon paper electrode surrounded by expanded metal or perforated foil scaffolds (e.g., non-coated nickel). The electrode may include a catalyst layer and a gas diffusion layer. The scaffold can partially or completely encapsulate the electrode, and be welded, crimped, and/or mechanically fastened therearound. These simplified recombination systems do not include a casting, pressing, coating, or infiltration process of the catalyst on or into the scaffold, as the electrode and scaffold form discrete layers in the recombination system. These recombination systems also do not require any heat treatment. Heat is generated in the electrode during the recombination reaction and is conducted to the scaffolding, and then transferred out of the battery through a thermal bridge that extends through the housing. The thermal bridge can be metal, ceramic, carbon, or a conductive polymer.

The recombination devices contemplated herein can be fabricated by surrounding a carbon cloth electrode comprised of catalyst and gas diffusion layers with an expanded metal or perforated foil scaffold—thereby defining alternating discrete layers in contact with each other. The catalyst in the electrode can be comprised of platinum, palladium, silver, ruthenium, rhodium, osmium, iridium, copper, or combinations thereof. The scaffold can be comprised of nickel, chromium, aluminum, brass, bronze, zinc, copper, tin, stainless steel, steel, silver, or combinations thereof. The scaffold can be attached to itself by welding, crimping, and/or utilization of a mechanical fastener, thus creating mechanical and thermal support for the electrode. The scaffold can then be mechanically attached to a thermal bridge that extends out of the battery housing.

In one example, a recombination device includes a carbon cloth electrode, containing a platinum catalyst, surrounded by an expanded nickel metal scaffold welded at the ends to envelope the carbon cloth electrode. The expanded nickel metal is positioned in the head space of the battery and welded to the battery terminal that extends through the battery housing. Heat generated during the recombination of hydrogen and oxygen at the carbon cloth electrode is conducted away from the catalyst via the expanded nickel metal to the terminal, which serves as a thermal bridge.

A recombination device, in another example, is a multi-layer system that includes a carbon cloth electrode, containing a platinum catalyst, surrounded by an expanded nickel metal scaffold in contact with a second expanded nickel metal scaffold surrounding a second carbon cloth electrode. The expanded nickel metal scaffolds are positioned in the head space of the battery and welded to the battery terminal that extends through the battery housing. As in the example immediately above, heat is conducted away from the catalysts via the metal scaffolds to the battery terminal.

Impregnating metal foam with a catalytic mass and then subjecting the whole to a heat treatment to sinter the hydrophobic binder is a common method to fabricate a recombination device. This requires many steps, extensive labor, and is expensive. This process is not necessary for the recombination systems proposed here, which simplifies the methods for fabrication. The electrode with hydrophobic gas diffusion and catalyst layers permits hydrogen and oxygen access to the catalyst while preventing water produced during recombination from blocking gas access to the catalyst. The expanded metal or perforated foil scaffold acts as a mechanical support for the carbon cloth electrode and a heat dissipation structure. Conductive heat transfer by the scaffold prevents the catalyst from reaching elevated temperatures during recombination that can otherwise be problematic for the battery components and housing. For efficient heat transfer, the contact area between the scaffold and thermal bridge that extends through the housing should be maximized to reduce thermal contact resistance. This is accomplished by using an expanded metal or perforated foil for the scaffold rather than a metal foam, which has lower contact area and thus higher thermal contact resistance.

Referring to FIG. 1, a recombination device 10 includes a carbon felt electrode 12 and an expanded metal scaffold 14 encapsulating the carbon felt electrode 12 therebetween. The expanded metal scaffold 14 includes first and second layers 16, 18 that have larger area than the carbon felt electrode 12, creating an overhang portion 20 around a perimeter of the recombination device 10. The expanded metal scaffold 14 thus completely envelops the carbon felt electrode 12.

The overhang portion 20 permits the first and second layers 16, 18 to be drawn together. In this example, free ends 22 of the first and second layers 16, 18 are fixed together via welds 24. Crimping or mechanical fasteners may also be used to fix the free ends 22 together.

Referring to FIG. 2, the carbon felt electrode 12 includes a hydrophobic gas diffusion layer 26 and a catalyst layer 28. The catalyst layer 28 is configured to recombine hydrogen and oxygen into water. The first layer 16 is in contact with, but not bonded to, the hydrophobic gas diffusion layer 26. The second layer 18 is in contact with, but not bonded to, the catalyst layer 28.

Referring to FIG. 3, several of the recombination devices 10 may be stacked together to form an aggregated recombination device 30. Other external structures, such as braces or frames (not shown), may be used to hold the recombination devices 10 together. Welding, crimping, and/or mechanical fasteners 31 may also be used to join the respective adjacent expanded metal scaffolds 14, 14 together.

Figure 4:
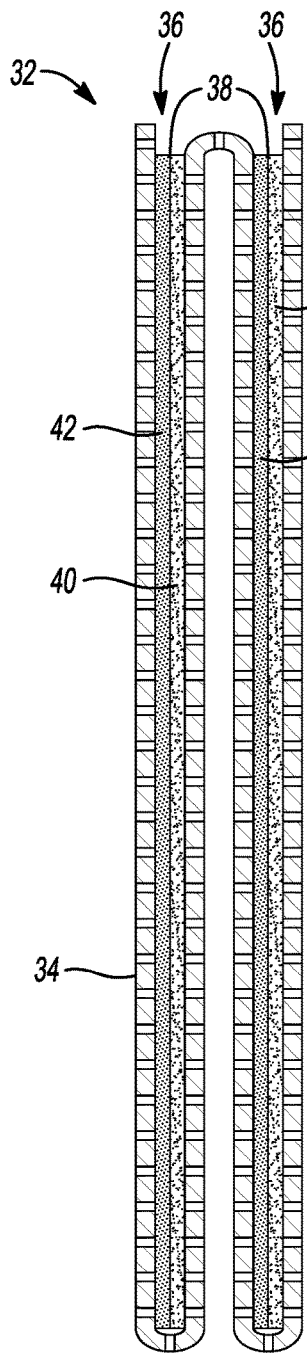

Referring to FIG. 4, a recombination device 32 includes a perforated foil scaffold 34 folded into a "W" configuration to create gap portions 36, and carbon paper electrodes 38 inserted into each of the gap portions 36 so as to be in contact with the perforated foil scaffold 34. The perforated foil scaffold 34 and carbon paper electrodes 38 thus define alternating discrete layers in contact with each other. As with the examples above, each of the carbon paper electrodes 38 includes a hydrophobic gas diffusion layer 40 and a catalyst layer 42.

Figure 5:
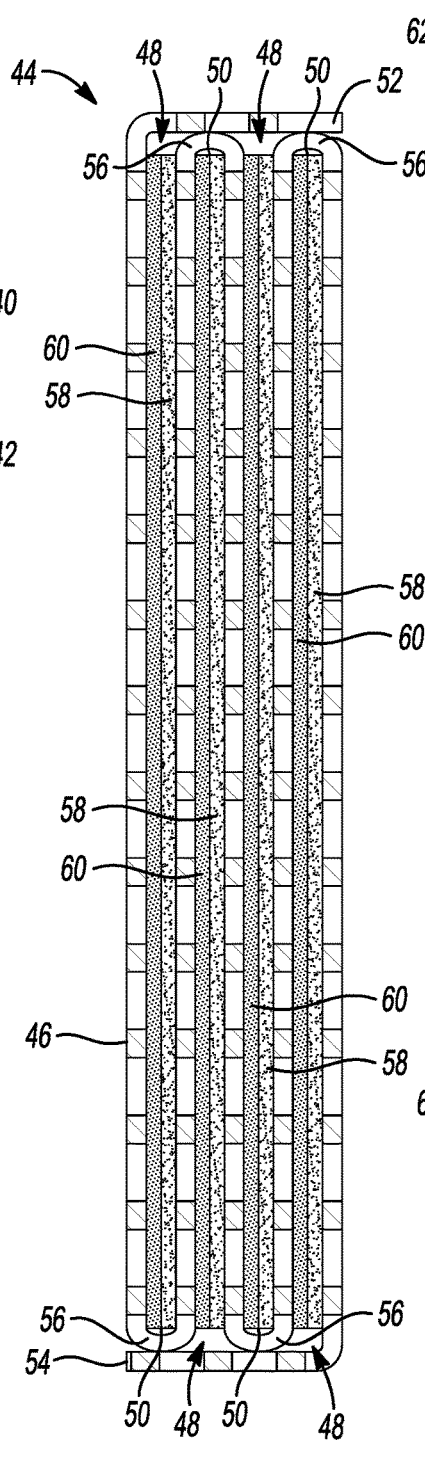

Referring to FIG. 5, a recombination device 44 includes an expanded metal scaffold 46 folded into an accordion-like configuration to create gap portions 48, and carbon foam electrodes 50 inserted into each of the gap portions 48. End portions 52, 54 of the expanded metal scaffold 46 are folded over and contact "U" portions 56 of the expanded metal scaffold 46 to prevent exit of the carbon foam electrodes 50 from the gap portions 48. Similar to the above, each of the carbon foam electrodes 50 includes a hydrophobic gas diffusion layer 58 and a catalyst layer 60.

Figure 6:
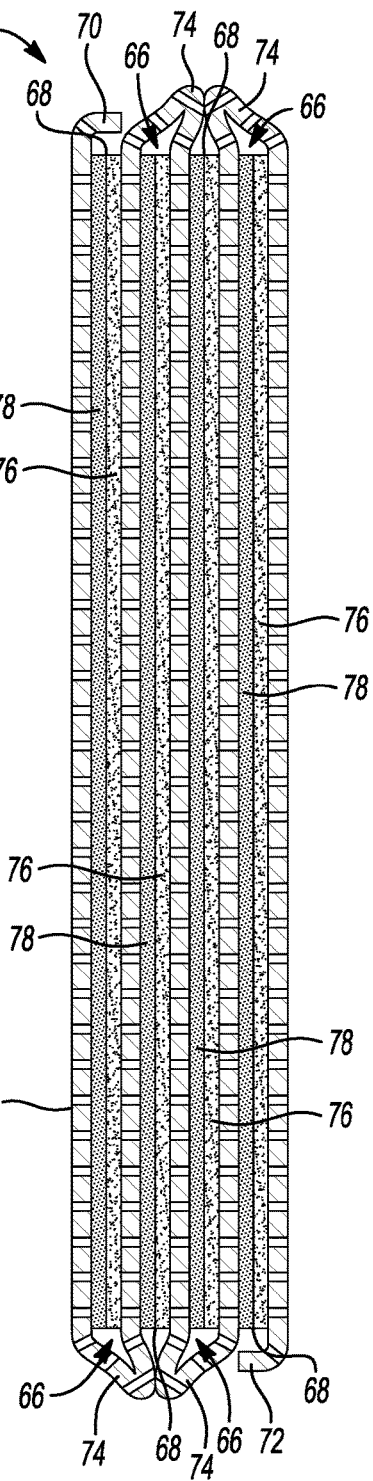

Referring to FIG. 6, a recombination device 62 includes a perforated metal scaffold 64 folded into an accordion-like configuration to create gap portions 66, and carbon cloth electrodes 68 inserted into each of the gap portions 66. End portions 70, 72 of the perforated metal scaffold 64 are folded over and "U" portions 74 of the perforated metal scaffold 64 are crimped together to prevent exit of the carbon cloth electrodes 68 from the gap portions 66. Each of the carbon cloth electrodes 68 includes a hydrophobic gas diffusion layer 76 and a catalyst layer 78.

Referring to FIG. 6, a recombination device 62 includes a perforated metal scaffold 64 folded into an accordion-like configuration to create gap portions 66, and carbon cloth electrodes 68 inserted into each of the gap portions 66. End portions 70, 72 of the perforated metal scaffold 64 are folded over and "U" portions 74 of the perforated metal scaffold 64 are crimped together to prevent exit of the carbon cloth electrodes 68 from the gap portions 66. Each of the carbon cloth electrodes 68 includes a hydrophobic gas diffusion layer 76 and a catalyst layer 78.

Referring to FIG. 7, a recombination device 80 includes a perforated metal scaffold 82 folded into a "U" configuration, a perforated metal scaffold 84 attached at a bend 86 of the perforated metal scaffold 82 to create two gap portions 88, and carbon felt electrodes 90 inserted into each of the gap portions 88. Each of the carbon felt electrodes 90 includes a hydrophobic gas diffusion layer 92 and a catalyst layer 94.

Referring to FIG. 8, a recombination device 96 includes a perforated foil scaffold 98 folded into a "W" configuration to create gap portions 100, and carbon paper electrodes 102 inserted into each of the gap portions 100. An end portion 104 of the perforated foil scaffold 98 is folded over to prevent exit of the carbon paper electrodes 102 from the gap portions 100. Again, the carbon paper electrodes 102 include a hydrophobic gas diffusion layer 106 and a catalyst layer 108. In this example, the recombination device 96 is mounted to a terminal 110 of a battery. Portions of the perforated foil scaffold 98 are attached (e.g., welded, mechanically fastened, etc.) to the terminal 110.

While exemplary embodiments are described above, it is not intended that these embodiments describe all possible forms encompassed by the claims.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A secondary battery recombination system comprising:
   catalyst and hydrophobic gas diffusion layers defining a carbon cloth electrode, a carbon felt electrode, a carbon foam electrode, or a carbon paper electrode, wherein the catalyst layer is configured to recombine hydrogen and oxygen into water; and
   an expanded metal scaffold or perforated foil scaffold encapsulating and in non-bonded contact with the electrode.

2. The secondary battery recombination system of claim 1, wherein the scaffold is folded around the electrode.

3. The secondary battery recombination system of claim 2, wherein the scaffold has a W-shape, U-shape, or accordion-shape.

4. The secondary battery recombination system of claim 1, wherein the scaffold completely envelops the electrode.

5. The secondary battery recombination system of claim 1, wherein the scaffold is a coating-free nickel scaffold.

6. The secondary battery recombination system of claim 1, wherein the scaffold includes a weld, crimp, or mechanical fastener.

7. A secondary battery recombination system comprising:
   a carbon cloth electrode, a carbon felt electrode, a carbon foam electrode, or a carbon paper electrode configured to recombine hydrogen and oxygen into water; and
   an expanded metal scaffold or perforated foil scaffold surrounding the electrode and arranged such that the scaffold and electrode define alternating discrete layers in contact with each other.

8. The secondary battery recombination system of claim 7, wherein the scaffold is folded around the electrode.

9. The secondary battery recombination system of claim 8, wherein the scaffold has a W-shape, U-shape, or accordion-shape.

10. The secondary battery recombination system of claim 7, wherein the scaffold completely envelops the electrode.

11. The secondary battery recombination system of claim 7, wherein the scaffold is a coating-free nickel scaffold.

12. The secondary battery recombination system of claim 7, wherein the scaffold includes a weld, crimp, or mechanical fastener.

13. The secondary battery recombination system of claim 7, wherein the electrode includes a hydrophobic gas diffusion layer.

14. The secondary battery recombination system of claim 7, wherein the electrode includes a catalyst layer.

15. A secondary battery comprising:
    a battery terminal; and
    a recombination device mounted to the battery terminal and including (i) a carbon cloth electrode, a carbon felt electrode, a carbon foam electrode, or a carbon paper electrode and (ii) a metal scaffold folded around and in non-bonded contact with the electrode, wherein the electrode includes catalyst and hydrophobic gas diffusion layers and wherein the catalyst layer is configured to recombine hydrogen and oxygen into water.

16. The secondary battery of claim 15, wherein the metal scaffold is a metal foam.

17. The secondary battery of claim 15, wherein the metal scaffold is a perforated foil.

18. The secondary battery of claim 15, wherein the metal scaffold is an expanded metal.

19. The secondary battery of claim 15, wherein the metal scaffold has a W-shape, a U-shape, or accordion-shape.

* * * * *